(No Model.)
W. P. BUCHAN.
SIPHON WATER TRAP.
No. 326,713. Patented Sept. 22, 1885.
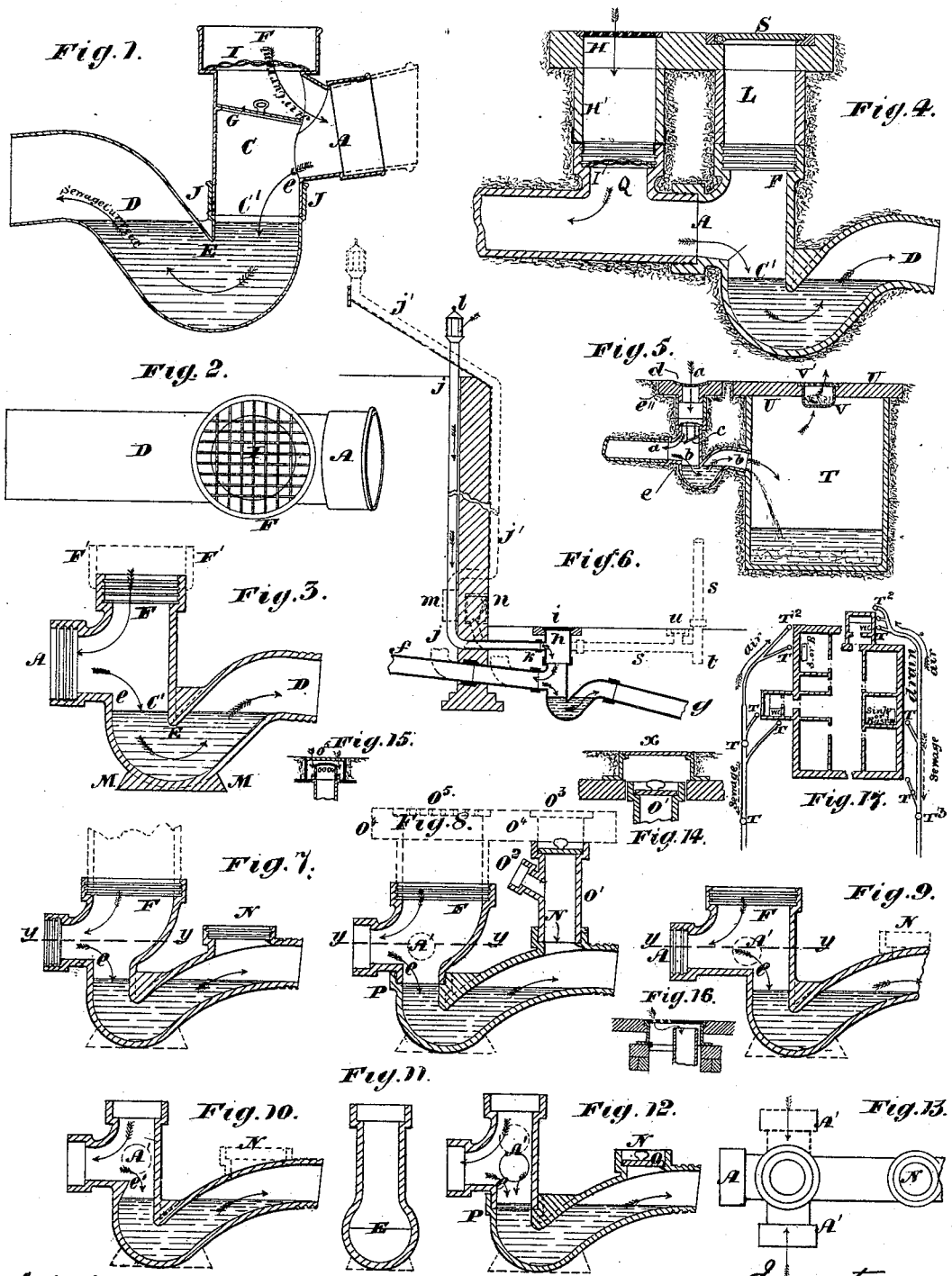

UNITED STATES PATENT OFFICE.

WILLIAM PATON BUCHAN, OF GLASGOW, COUNTY OF LANARK, SCOTLAND.

SIPHON WATER-TRAP.

SPECIFICATION forming part of Letters Patent No. 326,713, dated September 22, 1885.

Application filed December 18, 1883. (No model.) Patented in England April 23, 1875, No. 1,499.

*To all whom it may concern:*

Be it known that I, WILLIAM PATON BUCHAN, a citizen of the United Kingdom of Great Britain and Ireland, residing at Glasgow, in the county of Lanark, Scotland, have invented Improvements in Siphon Water-Traps, (for which I have received Letters Patent in Great Britain, bearing date the 23d day of April, 1875, No. 1,499;) and I do hereby declare that the following is a full, clear, and exact description of the invention, which will enable others skilled in the manufacture to which it appertains to make and use the same.

This invention has reference to improvements in siphon water-traps used in trapping the water-closet soil-pipes and the waste-water pipes leading or dipping into the drains of houses or other buildings, and which traps are also to be used on the drains themselves, and in conjunction with or on main or side sewers; and the objects of the improvements are, first, to construct ventilating and disconnecting siphon-traps with a perpendicular or "square" drop at the exit from the branch connected to the soil or waste-water pipe or drain to cause in use a sinking action on the soil floating in the house side of the trap, whereby it is carried away more quickly than with traps otherwise constructed, and, second, through the formation of the trap to more easily and thoroughly ventilate the soil, waste-water, and drain pipes and sewers, and the better to prevent the formation, accumulation, or concentration of foul air or gases in them.

On the appended drawings, Figure 1 is a vertical section, and Fig. 2 a plan, of a ventilating siphon-trap with perpendicular or square drop as constructed in accordance with one modification of my said invention, the said trap being made in cast-iron or other metal, metal being suitable for the smaller sizes of, say, six inches in diameter and under. Fig. 3 is a vertical section of the trap as constructed in fire-clay or earthenware, in which materials the trap is preferably made in all sizes from four inches and upward in diameter or width. Fig. 4 is a vertical section of a modification, in which the air or ventilating branch, instead of being formed on the trap itself, is made on a length of the soil, waste-water, or drain pipe. Fig. 5 shows the improved ventilating-trap in conjunction with a cesspool. Fig. 6 shows several modified arrangements of admitting air for ventilating the trap and drain or waste-water or soil pipes, and Figs. 7 to 13 are modifications of Fig. 3. Figs. 14, 15, and 16 show other modifications for terminating the upper end of the branch. Fig. 17 shows a system of house-drainage.

In the improved siphon ventilating-trap as illustrated at Figs. 1 and 2 a branch, A, is formed above the pool or well C, the edge or lip $e$ of the opening of the branch into the vertical part of the trap being formed square, so as to give a perpendicular drop of a few inches from the lower part of the opening to the level of the water in the trap, the inlet part C and outlet part D of the trap being separated or trapped off from each other by the tongue E. The advantages derived from this square or perpendicular drop, as distinguished from a rounded or gradual drop, are that, owing to the clear fall or cascade action which the water flowing from the soil, waste-water, or drain pipe gets over the sharp edge $e$, the accumulation of floating soil which so often takes place with other traps on the inner surface, $C'$, of the water is by this invention prevented, and instead of the rush of water down the drain-pipe merely running away under the floating soil the said rush breaks up the floating soil and carries it quickly away in the current underneath the dipping tongue E, and thence to the sewer, and in this it is greatly assisted by the force derived from the fall over the sharp edge of the vertical drop $e$. Fig. 10 of the drawings shows a modification of this arrangement, in which the square or sharp edge of the sewage-branch, instead of being vertical with the side of the trap, is carried toward the center, as indicated at $e'$, for the purpose of directing the flow into the center of the trap. For traps the wells of which are about six inches and under in diameter this projecting edge $e'$ would be useless; but for larger sizes it may sometimes be useful, where the volume of water or sewage running in is generally small.

In the trap, Figs. 1 and 2, the air for ventilating the drain-pipe to which the branch A is connected passes in at F, and thence up the drain in the direction of the arrow—that is to say, in the contrary direction to the sewage-current—a plate or disk being inserted so as to rest on a bead or flange at G to deflect the air-current.

The upper end, F, of the trap is made with a facet, into or on which is or may be fitted a section or length of pipe, as at L, Fig. 4, so that when the trap is in its place it has an inlet-chamber of any desired length above it. This chamber is fitted with an air-grating at top, as at H, Fig. 4; or the air to ventilate the drain may be otherwise admitted, as hereinafter more particularly explained. A disk, I, of wire gauze or netting is or may also be placed in the facet F, to prevent the entrance of stones or other obstructive matter or of rats or other vermin into the trap, and the upper and lower parts of the said trap may be made separate and joined together at the facet J; or the said joint may be dispensed with, and the whole trap made in one piece.

Fig. 3 is a vertical section of my improved ventilating siphon-trap as constructed in one piece of earthenware, fire-clay, or analogous material, A being the branch, with sharp, square, or vertical edge $e$, to which the soil, waste-water, or drain pipe is connected; and F, the air-inlet branch. When the grating at the upper end of the said branch, besides being used for the admission of air, is employed for the drainage of surface-water into the trap and thence to the sewer, an extra facet may be cast thereon, as indicated in dotted lines at F', for joining the pipe or chamber above the trap into and making it water-tight. This arrangement also allows a wider pipe or chamber to be used above the trap, if desired; and as a further means of allowing a wider pipe or chamber to be employed, and of affording access to the head of a workman for the purpose of cleaning out the trap and of looking along the drain, the air-inlet F, especially in sizes under nine inches in diameter, may be widened or enlarged, as indicated at Figs. 7, 8, and 9 of the drawings. The enlargement may be circular, oval, elliptical, or of other desired shape in plan, and may be projected either toward the sewer side of the trap, as at Figs. 7 and 8, or toward the drain, as at Fig. 9, in which case the sewage-branch A is somewhat longer than in the other arrangements.

The trap, Fig. 3, is shown provided with a sole or seat, M, which may, however, when desired, be dispensed with; and as a further means of affording access for cleaning out the trap it may be provided on the outer or sewer side with another access-opening, N, Figs. 7, 8, 9, 10, 12, and 13, closed by a lid or cover, which may either be in the position O, Fig. 12, or at or near the ground-level, and of round, oval, elliptical, or other form in plan. This opening is also equally applicable to the traps shown at Figs. 1, 2, and 4, and, besides serving as an access-opening, the said branch N may be utilized to ventilate the part of the drain beyond the trap, and also in some cases the sewer, in which case, preferably, a length of pipe, O', Fig. 8, is inserted in or rests on the facet of the branch N, the said length of pipe being formed or provided with a branch, $O^2$, to which a pipe is connected, and led up the side of the house or building to above the roof thereof, and through which the gases or foul air from the part of the drain beyond the trap or from the sewer escape or pass outward; or, instead of passing up the side of the house, the pipe from the branch $O^2$ may have any other convenient situation.

As shown in dotted lines at Fig. 8, the upper end of the branch O' may be terminated by a flat plate or cover, $O^3$, of metal, recessed into a stone or fire-clay block, $O^4$, the said plate being hinged or not, as desired, and the branch F of the trap may be similarly terminated by a perforated plate, $O^5$, through which the air passes into the trap and drain or pipe; or the said branch F may be terminated as seen at Fig. 15, in which case a perforated hood is placed in the upper end of the branch F, under the perforated plate $O^5$, to prevent dirt or foreign matters from passing into the branch F; or the branch may be terminated as at Fig. 16.

Fig. 14 shows another mode of terminating the upper end of the branch O', Fig. 8, in which case an iron frame or box resting on brick-work or on a stone or fire-clay slab is placed over the branch O', the said frame being provided with a lid or cover, $x$. The frame, Fig. 14, may also be used in conjunction with the branch F, in which case the cover $x$ may be a grating.

The traps, Figs. 7, 8, and 9, may in some circumstances be terminated at the dotted line $y\ y$—that is to say, the part above the said line may be dispensed with, as, for example, in man-holes—and all the traps under this invention at the part where the vertical portion joins the curved portion—that is to say, at the point E, Fig. 3—may be widened to provide a freer outlet, and have the passage ▢-shaped, as at Fig. 11 of the drawings.

The upper part of the trap, Fig. 3, embracing the air and sewage inlets, may be made in a separate piece from the remainder, and joined thereto by a facet-joint, as at P, Figs. 8 and 12, and the sewage-inlet A, in lieu of being in the position shown, may be in or about the position shown at A', Figs. 8, 9, 10, 12, and 13, or in any other desired position; or extra sewage or air inlets may be made at the said position, in which latter case, and when the trap is made in two pieces, the upper part may be turned round at pleasure, so as the more readily to connect with both sewage and air pipes.

In the arrangement Fig. 4 of the drawings the air-inlet to the drain, instead of being through the branch F of the trap, as hereinbefore described, is through a separate chamber, H', connected to a branch, Q, formed on one length of the drain-pipe. This arrangement may be used in some cases as an extra precaution against the freezing of the water in the trap.

The well or chamber H' may be placed any desired distance back from the trap, and it is covered with a grating, H, for the inlet of the air, while the well or chamber L above the branch F of the trap is covered with a close lid, S, which may be hinged, if desired.

Fig. 5 shows the improved ventilating siphon-trap in conjunction with a cesspool. In this case the trap is constructed and fitted in any of the modes hereinbefore described, excepting that its outlet end, in lieu of being connected to the sewer, discharges into the close cesspool T, which is surmounted by a portable or removable stone or cover, U, for allowing it to be emptied and cleaned out, when desired. The arrows $a$ indicate the direction of the air-current and the arrows $b$ that of the sewage; and to prevent the accumulation of any foul air within the tank or cesspool T exercising a pressure on the water in the trap, and so lowering its level on the outlet side and permitting the escape and passage back into the house-drain of such foul air or gas, I introduce a wire cage, V, or its equivalent, either in the position shown—that is to say, above the center of the cesspool—or at one side and apart from the stone or cover U, to allow of the free escape of such foul air through the grating V', with which the cage is covered. The cage is filled with charcoal or other purifier to purify and disinfect the air before it is discharged. In this case, to deflect the air-current up the drain from the surface of the water in the well of the trap, so as the better to prevent freezing, a plate, $c$, hung on chains, or otherwise suspended or held, is shown employed, which plate or the plate G, Fig. 1, may also be used for the like purposes in conjunction with any of the other traps described, if desired.

The slop-stone or fire-clay block $e''$, Fig. 5, is shown adapted to act as a drain for the surface-water into the trap, for which purpose it is dished and formed with a projection downward into the upper end of the well, for the purpose of preventing such leakage at that point as would cause soakage of the ground around, as is so common with ordinary slop-stones which have not this bottom projection. The grating $d$ on top of the stone may be made of metal and movable.

In all the improved traps the side of the air-inlet immediately above the sewage-branch A is rounded or beveled, so as the better to direct the air-current up the said branch.

An advantage of the arrangement of my improved ventilating siphon water-trap is the small surface of water exposed in the inner side of the trap or well, which not only allows the soil to be washed away more readily, as hereinbefore explained, but also affords less surface for evaporation or for the exhalation of any noxious gases.

Fig. 6 of the drawings shows my improved ventilating-trap in conjunction with part of a house-drain or soil-pipe, $f$, and part of the drain $g$, and also illustrates various modes of admitting fresh air to or ventilating the house-drain or soil-pipe through the trap differing from those hereinbefore described. In all of the modes shown on the said figure the upper end of the well $h$ is covered by a close or solid plate, $i$, and under one mode of admitting the air a pipe, $j$, is conducted from a branch, $k$, in the side of the well upward inside the wall of the house or building and through the roof, where it may be surmounted with an inlet-ventilator, $l$, or be merely terminated open, or protected with a cowl, cover, or grating, to prevent the ingress of foreign matter to the pipe.

Under another mode the air-inlet pipe may be conducted upward a short distance at the inside of the wall of the house or building, and then passed to the outside and conducted up to the ridge of the roof, as indicated in dotted lines at $j'$.

These two arrangements, and especially the first, enable the air to be heated before passing into the trap, thereby in cold weather lessening the risk of freezing the water; and as a further means of heating the air before entering the trap a chamber may be made at $m$, surrounding the pipe $j$, in which gas may be burned, or into which hot water, steam, or heated air may be conducted and circulated.

Under another arrangement the air, instead of passing down from above the roof of the house or building, may pass into the trap through a box in the side of the wall, as indicated in dotted lines at $n$. In this case the front of the box consists of a grating, at the interior of which is a hanging valve opening inward, and which, in the event of a back current, closes against the grating.

The right-hand side of Fig. 17 of the drawings illustrates what may be called an "isolation" or "sectional" system of house-drainage, in which the drains and soil-pipes are trapped by my improved ventilating-traps at the positions marked T, and a special pipe, $T^2$, is connected to the drains at a point outside of or beyond the point at which the soil, waste-water, and rain pipes are connected. The special pipe $T^2$ ventilates the drain in connection with the main trap $T^3$.

The pipes used in connection with the application of the invention should be coated inside with red lead, tar, or equivalent protective substance or composition, to prevent rust or corrosion, especially when iron pipes are used.

Having now described my said invention, what I desire to secure by Letters Patent is—

1. In a siphon water-trap for disconnecting orizontally-arranged sewers, drains, soil, aste-water, and rain pipes, the vertical or "square" drop e for the liquid or soil, substantially as and for the purposes described.

2. In a siphon water-trap for ventilating and disconnecting horizontally-arranged sewers, drains, soil, waste-water, and rain pipes, the combination of the vertical or square drop e and the ventilating-branch F, substantially as described.

In testimony whereof I, the said WILLIAM PATON BUCHAN, have hereunto set my hand and seal this 3d day of December, 1883.

WILLIAM PATON BUCHAN. [L. S.]

Witnesses:
 JOHN BURNS,
 WILLIAM HANSEN,
  Both of 135 Buchanan St., Glasgow.